United States Patent [19]

Plowman et al.

[11] Patent Number: 4,722,773
[45] Date of Patent: Feb. 2, 1988

[54] ELECTROCHEMICAL CELL HAVING GAS PRESSURIZED CONTACT BETWEEN LAMINAR, GAS DIFFUSION ELECTRODE AND CURRENT COLLECTOR

[75] Inventors: Keith R. Plowman, Baton Rouge; Richard E. Zachary, Clinton, both of La.

[73] Assignee: The Dow Chemical Company, Midland, Mich.

[21] Appl. No.: 661,633

[22] Filed: Oct. 17, 1984

[51] Int. Cl.⁴ .................... C25B 7/16; C25B 1/34
[52] U.S. Cl. .................... 204/98; 204/128; 204/252; 429/13; 429/40; 429/41; 429/42
[58] Field of Search ............ 204/98, 128, 263–266, 204/279, 282, 294, 252; 429/13, 40–43

[56] References Cited

U.S. PATENT DOCUMENTS

| | | | |
|---|---|---|---|
| 4,204,920 | 5/1980 | Kurtz et al. | 204/98 |
| 4,214,958 | 7/1980 | Coker et al. | 204/98 |
| 4,265,719 | 5/1981 | Ezzell et al. | 204/98 |
| 4,278,525 | 7/1981 | Gestaut | 204/294 |
| 4,287,032 | 9/1981 | Pellegri | 204/294 |
| 4,293,394 | 10/1981 | Darlington et al. | 204/98 |
| 4,299,682 | 11/1981 | Oda et al. | 204/265 |
| 4,311,568 | 1/1982 | Balko | 204/282 |
| 4,315,805 | 2/1982 | Darlington et al. | 204/98 |
| 4,336,123 | 6/1982 | Du Bois | 204/282 |
| 4,343,690 | 8/1982 | de Nora | 204/263 |
| 4,350,580 | 9/1982 | Kadija | 204/279 |
| 4,354,917 | 10/1982 | Solomon | 204/294 |
| 4,354,958 | 10/1982 | Solomon | 204/294 |
| 4,386,987 | 6/1983 | Covitch et al. | 204/294 |
| 4,456,521 | 6/1984 | Solomon et al. | 204/294 |

*Primary Examiner*—John F. Niebling
*Attorney, Agent, or Firm*—Andrew E. Pierce

[57] ABSTRACT

An electrochemical cell having a hydraulically impermeable permselective membrane located between electrodes comprising at least one gas diffusion, laminar electrode having hydrophilic and hydrophobic layers and attendant current collector means is operated with greater efficiency by forcing the laminar, gas diffusion electrode against the current collector means so as to make and maintain electrical contact therebetween by means of gas pressure exerted against the hydrophobic side of the laminar, gas diffusion electrode opposite to that which faces the permselective membrane.

25 Claims, 10 Drawing Figures

ELECTROCHEMICAL CELL HAVING GAS PRESSURIZED CONTACT BETWEEN LAMINAR, GAS DIFFUSION ELECTRODE AND CURRENT COLLECTOR

BACKGROUND OF THE INVENTION

1. Field of the Invention

This invention relates to electrochemical cells having a laminar, gas diffusion electrode comprising a porous, hydrophilic layer; a porous, hydrophobic layer; and a separate and distinct current collector means.

2. DESCRIPTION OF THE PRIOR ART

U.S. Pat. No. 4,212,714 and U.S. Pat. No. 4,214,958 relate to electrolysis of alkali metal halides in a three-compartment electrolysis cell having two ion transporting permselective membranes. At least one of the two electrodes of said cell is physically bonded to one of said permselective membranes to form a unitary structure. The cell liquid pressure in the central compartment of the cell forces the permselective membrane/electrode outward and against a current collector. The cathodes of the cells disclosed in these references can comprise a bonded fluorocarbon, catalyst, and graphite mixture. However, these cathodes are not properly characterized as gas diffusion electrodes.

SUMMARY OF THE INVENTION

An electrochemical cell, particularly an electrochemical cell requiring reduced electrical potential to operate can be obtained by the process of the invention. By the process of the invention an electrochemical cell having at least one gas diffusion electrode characterized as a laminar, gas diffusion electode comprising a porous, hydrophilic layer and a porous, hydrophobic layer wherein said hydrophilic layer comprises conductive carbon and a polymeric binder therefor and said hydrophobic layer comprises a hydrophobic polymer, can be improved in electrical efficiency by utilizing gas pressure to force said electrode, particularly a cathode of said cell, against a metal current collector means so as to establish and maintain electrical contact between said current collector means and said gas diffusion electrode. The gas pressure is applied on the hydrophobic polymer layer of the laminar electrode thereby forcing the hydrophilic layer on the opposite side of the electrode against said curret collector means. The current collector means is an assembly comprising a metal mesh and a metal support structure. The metal mesh can have less thickness than is conventional in electrolytic cells, thus providing improved electrical contact with said laminar electrode, in view of the fact that a metal support structure is utilized in conjunction with said metal mesh as a backing metal layer.

DESCRIPTION OF THE DRAWINGS

Figure 1:
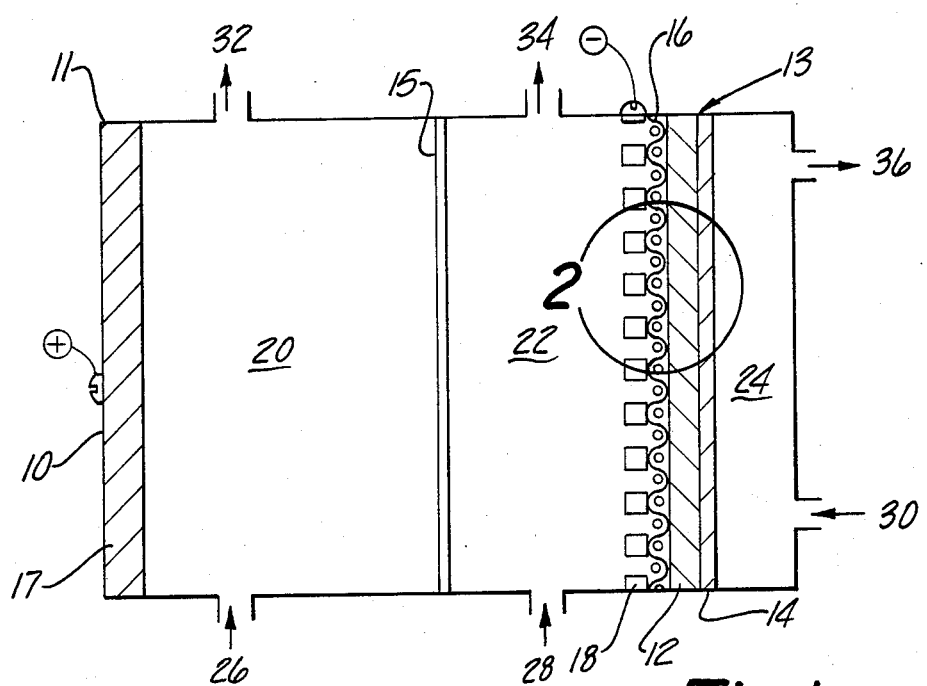
FIG. 1 is a diagrammatic side view of an electrolysis cell employing the electrode assembly of the present invention.
Figure 2:
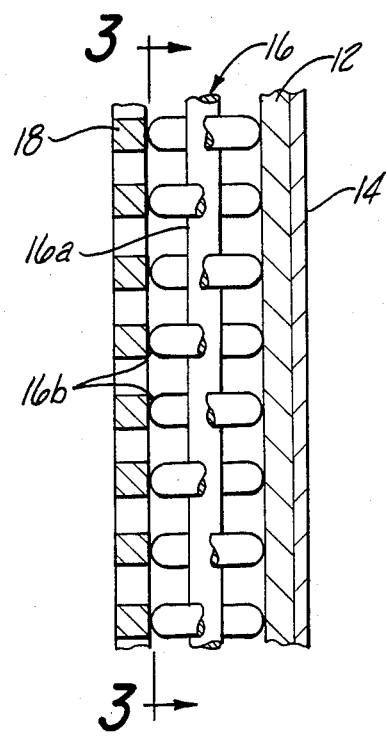
FIG. 2 is an enlarged view of that portion of the electrolysis cell of FIG. 1 shown encircled in FIG. 1 wherein metal support structure 18 is shown contacting metal mesh 16 which is shown in this figure as unflattened woven wire, said metal mesh being in contact with the hydrophilic layer 12 of a gas diffusion electrode.
Figure 5:
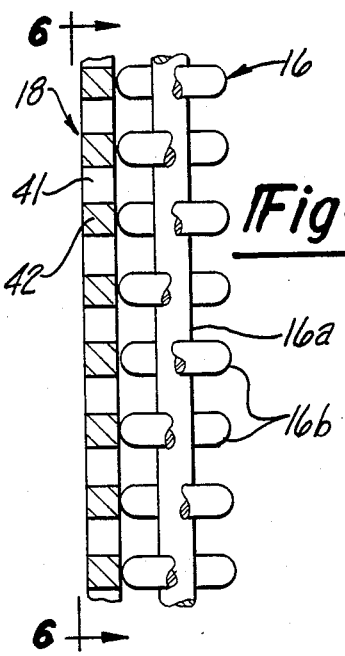
FIG. 5 is a view similar to that of FIG. 2 but without gas diffusion electrode 13.
Figure 6:
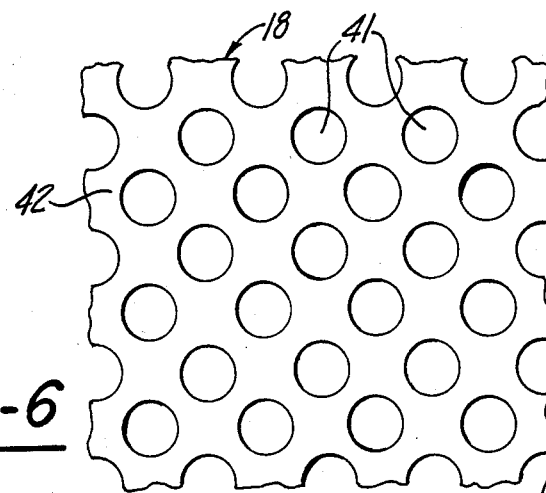
FIG. 6 is a front view of the metal support structure 18 taken along line 6—6 in FIG. 5; the metal support structure being made of punched plate.

Referring to FIG. 1, electrolysis cell 10 can be seen to comprise a cell housing 11. Cell 10 is divided into two interior compartments by membrane 15. The compartment to the left of membrane 15 contains anode 17 and anolyte 20, and therefore is referred to as the anolyte compartment. The compartment to the right of membrane 15 contains cathode 13 and catholyte 22 and therefore is referred to as the catholyte compartment. Anode 17 is shown as vertically oriented and spaced apart from membrane 15. Electrode 13 is in contact with metal mesh 16 which in turn is contacted by metal support structure 18 so as to establish and maintain electrical supply to cathode 13. A gas compartment is shown as 24 with an inlet at 30 and an outlet at 36. In the embodiment of the electrochemical cell in which the cell is a chlor-alkali cell for the production of chlorine and sodium hydroxide, the reaction product at the anode, namely chlorine gas would be removed from the anolyte compartment 20 at outlet 32, a brine solution would be fed into the anolyte compartment of the cell at inlet 26, water or sodium hydroxide solution would be fed into the catholyte compartment 22 through inlet 28 and an alkali metal hydroxide solution removed through outlet 34. The gas diffusion electrode assembly consists of cathode 13 having hydrophilic layer 12 and hydrophobic layer 14 in combination with metal mesh 16 and metal support structure 18. In FIGS. 2-10 there are shown various alternative metal support structures for the electrode assembly of the invention. Three different metal support structures are shown. The standard punched steel plate of FIGS. 5 and 6 is shown as an example of the metal support structure. Alternative metal support structures are shown in FIGS. 7-10 as unflattened louvered metal. Thus the standard punched steel plate metal support structure is shown in FIGS. 2, 5 and 6 as having openings 41 and metal areas 42.

Figure 3:
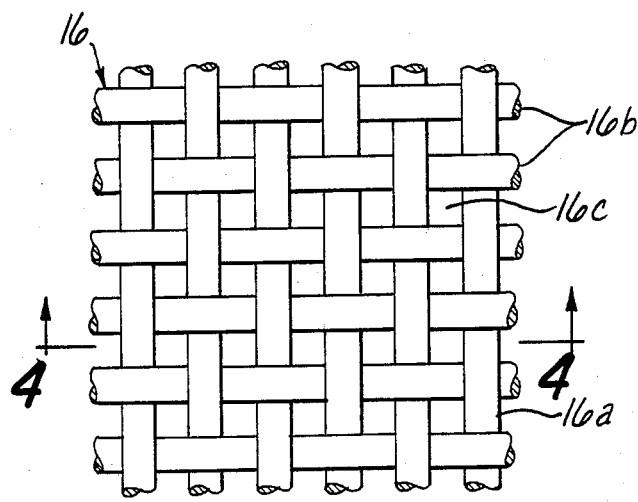
FIG. 3 is a front view, taken along line 3—3 in FIG. 2 of the unflattened woven wire mesh shown as 16 in FIG. 2.
Figure 4:
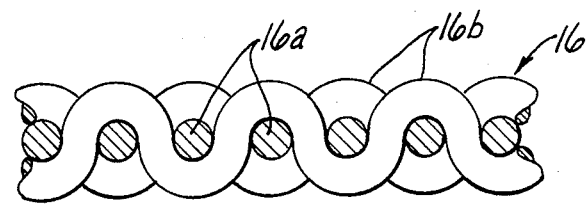
FIG. 4 is a bottom view of the woven wire mesh of FIG. 3 taken along line 4—4 in FIG. 3.

In FIG. 3 and FIG. 4 the woven metal mesh current collector 16 is shown as having vertical wire strands 16a and horizontal wire strands 16b with openings between the strands of the woven wire mesh as 16c.

Figure 8:
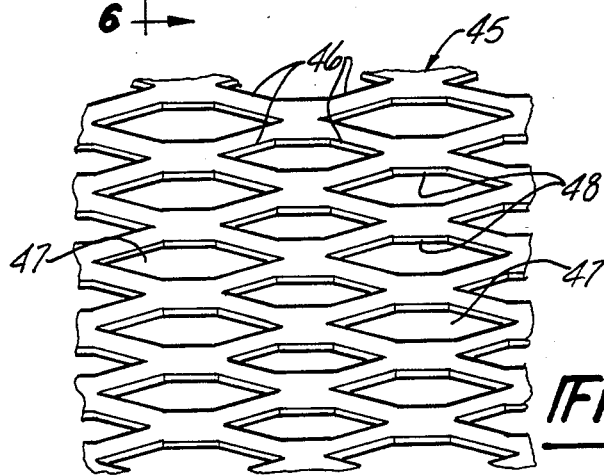
FIG. 8 is a front view of the unflattened expanded metal support structure 45 shown in FIG. 7 taken along line 8—8 in FIG. 7.
Figure 7:
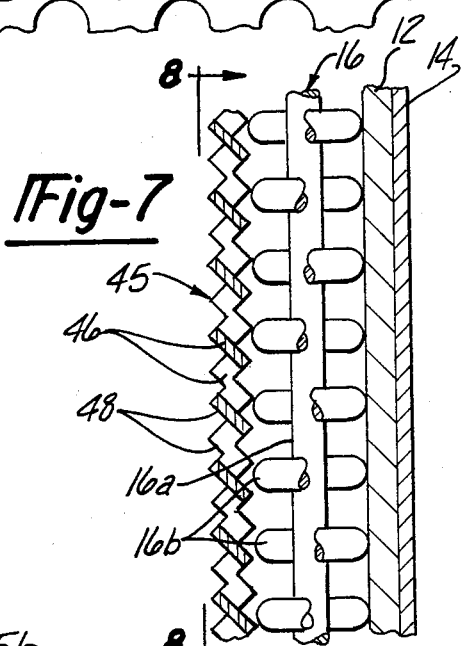
FIG. 7 is an alternative view of FIG. 2 in that a metal support structure 45 is made of unflattened expanded metal instead of punched plate.

Alternative to the use of punched plate metal support structures, there are shown in FIGS. 7-8 alternative louvered metal support structure 45 having supporting arms 46, openings in the louvered metal 47 and protruding edges 48.

Figure 9:
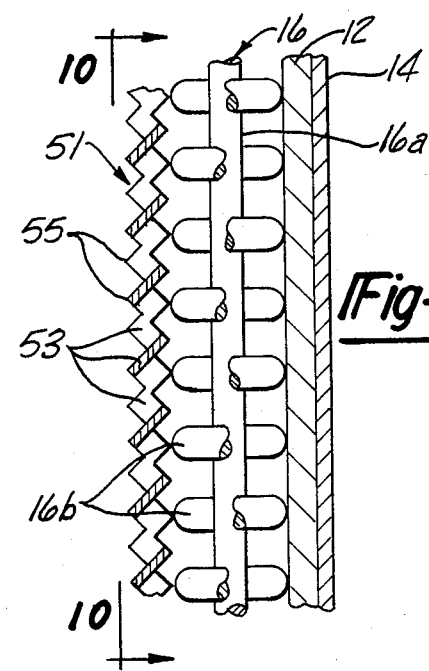
FIG. 9 is an alternative view of FIG. 2 showing a metal support structure 51 as being made of louvered metal.
Figure 10:
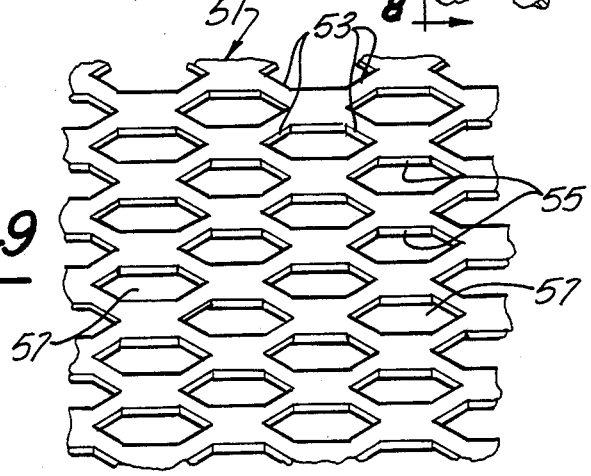
FIG. 10 is a front view of the louvered metal support structure 51 of FIG. 9 taken along line 10—10 of FIG. 9.

In an alternative design for a louvered metal support structure as shown in FIGS. 9 and 10, louvered metal support structure 51 is shown having supporting arms 53, protruding edges 55 and openings 57.

DETAILED DESCRIPTION OF THE INVENTION

An electrochemical cell is disclosed having a gas diffusion, laminar electrode wherein a gas pressure differential is applied to the hydrophobic side of the laminar electrode so as to force the opposing hydrophilic side of said electrode against a current collector means comprising a metal mesh and a support structure. The energy efficiency of said cell is increased because the electrode, metal mesh, and support structure assembly allows a better electrical contact to be established and maintained over the life of the electrode through the use of a smaller dimension metal mesh which makes more uniform electrical contact with the laminar electrode, thus improving cell performance. In addition, good electrical contact between the metal mesh of the current collector means and the laminar electrode is maintained because the electrode can conform to the collector under the influence of the applied pressure differential and compensate for any dimensional changes in the electrode material during the operational life of the electrode. Subsequent to extended operation of the cell, it may be necessary before renewing the electrical contact to reduce the oxides on the surface of the metal mesh and the metal support structure by replacing the electro-reactive gas with an electrochemically non-reactive gas and providing an electrical potential on the cathode and current collector means of the cell sufficient to reduce the current collector means surface to obtain the metal substantially free of oxide surface coating.

An electrochemical cell is defined in this specification and claims as including (1) electrolytic cells, particularly those for the electrolysis of an alkali metal halide, and (2) fuel cells such as those cells used for the direct production of electrical current from a fuel and oxidant which employ an oxidizing electrode, a fuel electrode, and a liquid electrolyte, particularly an aqueous electrolyte. For convenience, the invention will be disclosed in connection with an electrolytic cell. One skilled in this art would be able to utilize the disclosed means of making and maintaining electrical contact between the laminar, gas diffusion electrode, such as a cathode, and the current collector means by the use of a differential gas pressure applied to one side of said laminar electrode.

The present invention is based upon the discovery that the electrical contact of a metal mesh current collector with a laminar electrode having a hydrophilic layer comprising a conductive carbon and polymeric binder and a hydrophobic layer comprising a hydrophobic polymer can be improved by utilizing a metal mesh of less than conventional thickness in conjuction with a metal support means to provide a current collection means. Prior art methods of forming a metal mesh current collector bond with a laminar electrode by the use of pressure during fabrication provide electrode/current collector assemblies having inferior ageing properties as compared to the current collector/laminar electrode combination disclosed herein. In the prior art current collector/laminar electrode assemblies, the current collector-laminar electrode physical bond degrades during operation of the electrochemical cell. This is believed to result from the dimensional change of the electrode upon exposure to electrolyte as well as the formation of metal oxides on the surface of the metal mesh current collector. This degradation is ordinarily irreversible and thus causes a reduction in the life of the laminar electrode. By omitting making a physical bond between the metal mesh current collector and the laminar electrode, and merely utilizing gas pressure applied on the hydrophobic side of the laminar electrode to force the laminar electrode against a metal mesh, good electrically conductive contact can be obtained which is renewable. Thus the life of the electrode is extended. The reduced electrical conductivity effect of the formation of surface oxides and hydroxides on the metal mesh current collector can be overcome by increasing the electrode potential to a value where these surface oxides and hydroxides are reduced so as to expose the original metal surface before oxidation. This in effect allows the electrical contact between the metal mesh current collector and the laminar electrode to be renewed periodically without replacing the laminar electrode.

A structural support is necessary on one side of the metal mesh current collector in order to obtain good electrical contact between the laminar electrode and the metal mesh current collector. This metal structural support can be any of the conventional metal punched plate, expanded metal (flattened or unflattened) or louvered metal sheets commonly used as cathode material in electrolytic cell technology. Representative metal support structures are disclosed in U.S. Pat. No. 4,265,719, incorporated herein by reference.

The use of a gas pressure differential on a laminar, gas diffusion electrode having a hydrophilic and hydrophobic layer wherein the gas pressure differential is applied to the hydrophobic layer so as to make contact with a current collector means adjacent to the opposite surface of the electrode provides several advantages in the formation of electrodes for electrochemical, particularly electrolytic cells in the production of halogens from alkali metal halide brines. As indicated above, more stable electrical properties are obtained utilizing a separate electrode and separate metal mesh current collector as compared to prior art electrodes in which the laminar electrode is bonded to the metal mesh current collector. Where separate metal mesh and electrode structures are maintained, a wide choice of current collector materials can be utilized. In addition, the electrode is more easily fabricated since the prior art step of laminating the laminar electrode to a metal mesh current collector is eliminated. The elimination of this lamination step in the process of preparing a gas diffusion electrode allows greater flexibility in electrode shape since the unlaminated electrode is flexible and slightly elastic as compared to an electrode to which a metal mesh is laminated. In addition to these advantages, the present invention contemplates the use of metal mesh current collectors which are smaller in wire diameter as well as more closely woven so as to provide more uniform current distribution to the laminar electrode. A structural support member against which the metal mesh current collector is forced is necessary. The structural support member is more massive than the metal mesh. It functions both as a means for structural support and for current distribution. The use of a smaller wire diameter and a more closely woven metal mesh between the structural member and the laminar electrode provides a more uniform distribution of current to the electrochemically active layer of the laminar electrode with minimal voltage variation over the face of the electrode.

The laminar electrode of the invention can be any of the prior art, carbon-based laminar, gas diffusion electrodes having an electrochemically active hydrophilic layer containing a polymeric binder bonded to a hydrophobic layer. Generally, both layers of the electrode are porous. The hydrophobic layer comprises a hydrophobic polymer, preferably a hydrophobic thermoplastic halocarbon polymer. Preferably the polymeric binder in the hydrophilic layer is a thermoplastic halocarbon polymer. Suitable gas diffusion electrodes are disclosed in U.S. Pat. No. 3,594,236, incorporated herein by reference.

While polytetrafluoroethylene is the most preferred polymer for use in the preparation of the electrodes of the invention, if desired, other polymers can be used instead. Preferred hydrophobic polymers are the thermoplastic halocarbon polymers selected from the group consisting of at least one of polymers of tetrafluoroethylene, fluorinated ethylene propylene, copolymers thereof having the moieties

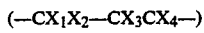

and

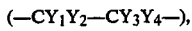

and homopolymers having the moieties

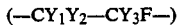

wherein $X_1$, $X_2$, $X_3$, $X_4$, $Y_1$, $Y_2$, $Y_3$, and $Y_4$ are selected from the group consisting of flourine, chlorine, and hydrogen, at least one of said X and Y being fluorine. Preferably the halocarbon polymer is a fluorocarbon polymer selected from the group consisting of at least one of copolymers having an ethylene moiety and a fluorocarbon moiety chosen from the group consisting of

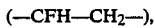

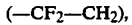

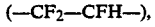

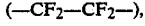

and

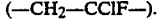

Suitable hydrophobic polymers can generally include any polymer having a low surface energy which will remain stable under fuel cell or chlor-alkali electrolysis cell operating conditions. Such polymers include polymers of various halogen-substituted hydrocarbon monomers, particularly fluorine-substituted olefinic monomers. Halogen-containing polymers that can be employed include polymers of fluorocarbons and substituted fluorocarbons wherein one or more fluorine atoms are replaced by hydrogen, chlorine, or bromine. Alternative halocarbon polymers include polytrifluoroethylene, polyvinylfluoride, polyvinylidene fluoride, polytrifluorochloroethylene, and copolymers of different fluorocarbon monomers such as copolymers of tetrafluoroethylene and hexafluoropropylene.

In addition to the halocarbon polymers, various other hydrophobic polymers which can be used include hydrocarbon polymers having a molecular weight of 50,000 to 1,000,000 or more, and a free surface energy close to or below that of polyethylene. Representative polymers include polymers and copolymers of ethylene, propylene, 3-ethyl-1-butene, 4-methyl-1-pentene, and 4,4-dimethyl-1-pentene. Silicone polymers are also suitable as hydrophobic polymers for use in the preparation of the electrodes of the invention.

The conductive carbon utilized in the formation of the hydrophilic layer of the gas diffusion electrodes can be any electrically conductive, hydrophilic carbon. For instance, acetylene black having a small particle size which is electrically conductive can be used. Certain other carbon blacks such as furnace black are also electrically conductive and can be used. The carbon used can be porous or non-porous. Generally, carbon blacks having a particle size ranging from about 0.01 to about 0.05 microns, and more usually within the range of about 0.01 to about 0.03 microns are suitable. The carbon black generally is admixed with at least one electrochemically active catalyst. The catalyst can also be added as a separate component. Carbon black is available commercially containing 5 to 10 percent by weight of an electrochemically active catalyst, such as silver, dispersed throughout the carbon black.

As an electrochemically active catalyst for use as a component of the cathode in a chlor-alkali electrolysis cell, a supported precious metal catalyst such as silver, platinum, palladium, rhodium, and the like (Group VIII of the periodic table, periods 5 and 6) or metal oxides such as combinations of nickel oxide and lithium oxide can be used. Where the electrode is utilized as an anode in a fuel cell, metals of Groups I-B, V-B, VI-B, and VIII of the periodic table can be used. For instance, chromium, tungsten, molybdenum, cobalt, nickel, silver, copper, platinum, palladium, rhodium, iridium, and other metals such as manganese and inorganic compounds containing one or more of such metals such as nickel oxide, manganese oxide, cobalt molybdate, vanadium pentoxide, and the like can be used. Platinum is especially active as an anode catalyst.

The current collector means is an assembly comprising a metal mesh and a support structure. The metal mesh can be a woven mesh fabric such as a 20×20×0.010 inch silver-plated nickel wire mesh and preferably wire meshes having less than 0.015 inch dimension wire strands and greater than 10 strands in each direction per inch. The wire mesh current collector can be prepared from a metal selected from the group consisting of stainless steel, nickel, platinum group metals, valve metals, and mixtures thereof. Preferably the metal mesh is prepared from a metal selected from the group consisting of silver or silver-coated nickel, or silver-coated steel, and silver-coated valve metals.

The support structure against which the current collector metal mesh is forced by the differential gas pressure applied to the porous, hydrophobic side of the gas diffusion electrode can be those conventional foraminous electrode substrates disclosed in U.S. Pat. No. 4,265,719, incorporated herein by reference. Generally, metal punched plate substrates, or expanded metal, i.e., a flattened or unflattened metal sheet, or louvered metal sheet can be utilized. These types of foraminous support substrates are utilized so as to allow the access of the electrolyte to the laminar electrode for ionic conduction and product removal to the bulk electrolyte. The support structure should be as open as possible yet should provide sufficient support and nearly uniform current distribution. At least 50% of the support structure should be open.

The electrochemical cells of the invention can utilize a gas compartment through which air or oxygen is introduced, semi-permeable membranes such as an asbestos diaphragm or an ion exchange permselective membrane, such as a cation-exchange membrane disposed between a cathode and an anode so as to form a catholyte compartment and an anolyte compartment. Said catholyte compartment contains said cathode and a volume of catholyte, said anolyte compartment contains said anode and a volume of anolyte, and the adjacent surfaces of said anode and said cathode are spaced apart sufficiently for said membrane to fit freely therebetween. Cation-exchange permselective membranes are particularly suitable for electrolysis of alkali metal halide brines to produce alkali metal hydroxides and halogen. Anion-exchange membranes can be used for other processes instead of cation-exchange membranes. Examples of cation-exchange membranes are those formed from organic resins, for instance, phenol-formaldehyde resins or resins obtained by polymerization of styrene and/or divinylbenzene, flourocarbon resins, polysulphones, or polymethacrylic or phenoxy resins, with cation-exchanging radicals such as $-SO_3H$, $-COOH$, $-PO_2H_2$, $-PO_3H_2$. Such resins also can be employed as mixed polymers or copolymers, for example, fluorcarbon resins can contain substituted or unsubstituted alkoxy groups and contain elements such as sulphur, nitrogen, and oxygen. Generally, resins with sulphonic groups are preferred, and among these polyfluorocarbon resins which contain cation-exchange groups and are copolymers of tetrafluoroethylene with $CF_2=CF-OCF_2CF_2SO_3H$, or other corresponding acidic polymerizable fluorocarbon. Preferably, the polyfluorocarbon is at least one of a polymer of perfluorosulphonic acid, a polymer of perfluorocarboxylic acid, and copolymers thereof. These copolymers have equivalent weights of about 900 to about 1800 and are characterized by long flourocarbon chains with various acidic groups including sulphonic, phosphonic, sulphonamide, or carboxylic groups or alkali metal salts of said groups attached thereto.

In the electrolysis process of the invention, an alkali metal halide brine is introduced into the anode compartment of an electrolytic cell; water or aqueous alkali metal hydroxide is introduced into the cathode compartment of the cell; said cathode and anode compartments are separated by a semi-permeable membrane; halogen and depleted brine are withdrawn through a common first conduit from the anode compartment to a brine collection point; and alkali metal hydroxide solution is withdrawn through a second conduit from the cathode compartment to an alkali metal hydroxide solution collection point. Improved electrical efficiency is obtained by providing as the cathode comprising an electrically conductive, porous, hydrophilic layer and a porous, hydrophobic layer wherein gas pressure is applied to said hydrophobic layer at a pressure sufficient to force said cathode against a current collector means so as to make and maintain electrical contact in order to minimize the electrical potential required for electrolysis.

The use of gas pressure to maintain electrical contact between a current collector and a carbon-based laminar electrode is particularly effective in an electrolytic cell where the electrolyte active layer of the electrode is able to withstand a pressure differential applied to the hydrophobic, gas-permeable layer of the electrode without significant bulk gas flow through the electrode, as evidenced by bubbling of the gas out of the electrolytically active layer of the electrode. It is unexpected that a substantial improvement in electrical contact between the metal current collector and the electrode can be obtained using laminar electrodes with pressure differentials on the hydrophobic layer thereof which do not allow significant bulk flow of the reactive gas. While it is desirable to utilize gas pressures greater than 5 lbs. per square inch gauge, in order to provide optimum electrical contact of the metal current collector and the laminar electrode, reasonable electrical contact is achieved even at low gas pressures such as pressures of less than 2 lbs. per square inch gauge. Preferably the gas pressure is greater than about 1 lb. per square inch gauge.

Renewal of the laminar electrode/metal current collector mesh contact can take place by replacing the electro-reactive gas with an electrochemically non-reactive gas followed by driving the electrode potential to cathodic values for a time sufficient to reduce the surface and eliminate oxides and hydroxides of the metal forming the metal mesh.

The use of gas pressure (air or oxygen in the case of the cathode of an electrolytic cell for the production of halogen and an alkali metal hydroxide) to maintain a laminar electrode in contact with a metal current collector means is applicable to electrolytic cell configurations wherein the metal mesh current collector is a planar sheet of woven wire (or expanded metal) and the electrode is a sheet of a carbon-based laminar electrode. Of course, other configurations of cathode (and anode) are compatible with the invention. For example, the invention is particularly applicable where cathodes and anodes can be pocket shaped, such as the cathodes described in U.S. Pat. No. 3,849,280, and the anodes described in U.S. Pat. No. 3,591,483, both of which patents are incorporated herein by reference.

The following examples illustrate the various aspects of the invention but are not intended to limit its scope. Where not otherwise specified throughout this specification and claims, temperatures are given in degrees centigrade, and parts, percentages, and proportions are by weight.

EXAMPLE 1

This example shows the effects of differential pressure as a means of maintaining contact of a current collector with an electrode surface.

A test apparatus was prepared to evaluate the effect of gas pressure on one side of a laminar electrode to force the opposite side of the electrode against a current collector as a means of improving the electrical efficiency of a gas depolarized, carbon-based electrode. The testing device consists of a stainless steel plate measuring one and one-half inches square having a half-inch diameter hole in the center of the plate. This hole is covered with a silver-soldered nickel screen of 20 mesh size which is 0.015 inches in thickness. This screen is soldered flush with the stainless steel surface of the plate. A second surface measuring one and one-half inches square is a Plexiglas sheet through which gas is supplied. This sheet also serves to support the assembly. Between the Plexiglas sheet and the stainless steel plate there is placed a laminar electrode which is a composite of a porous, electrolyte active layer and a porous polytetrafluoroethylene backing layer. The electrolyte active layer is prepared using a mixture of seventy parts by weight of a conductive, hydrophilic carbon impregnated with an electrochemically active catalyst and thirty parts by weight of polytetrafluoroethylene. The electrolyte active layer has a thickness of 10 mils and the polytetrafluoroethylene backing layer has a thickness of 10 mils.

The test equipment is placed in operation by inserting the above described electrode material between the stainless steel plate and the plastic surface insulated from the metal plate by a polytetrafluoroethylene gasket having a thickness of 0.002 inch (2 mils). The test equipment was operated under the following conditions: 75° C., and 100 grams per liter of sodium hydroxide. The electrode suspended between the stainless steel plate and the plastic plate is free to flex so as to make contact with the nickel screen as gas pressure is applied through the plastic surface against the polytetrafluoroethylene backing layer. Gas pressure was varied from 0.5 psi to 10 psi and electrode potential, subdivided into several components, was measured as a function of current density. Bulk gas flow, bubbling of oxygen into the electrolyte, was not observed over this pressure range.

Test results are shown in Table I where the observed improvemnnt (decreased polarization) which accompanies increased pressure is due clearly to a decrease in contact resistance. Over this pressure range, the observed potential decreases by 175 mv at 0.316 amp/cm$^2$ of which 160 mv results from improved collector-material contact. Improvement is expected as a result of increased oxygen activity and interfacial characteristics but these are shown to be small in comparison to the contribution by contact resistance.

TABLE I

EFFECT OF DIFFERENTIAL PRESSURE ON
ELECTRODE PERFORMANCE PRESSURE CONTACT[1]

| PRESSURE (psi) | CONTACT[2] RESISTANCE (ohm/cm$^2$) | E(measured) at .316 amp/cm$^2$ (V) | E (V) CONTACT CORRECTED[3] |
|---|---|---|---|
| 12" | 1.040(6)* | −0.631 | −0.329(3) |
| 2.5 | 0.864(9) | −0.572 | −0.299(4) |
| 5.0 | 0.710(6) | −0.529 | −0.305(3) |
| 7.5 | 0.601(5) | −0.480 | −0.290(2) |
| 10.0 | 0.531(6) | −0.456 | −0.288(2) |

[1]Electrode - 70% Carbon (Ag), 30% Teflon, Porous Teflon backing.
[2]With pressure contact only, a small lead can be attached to the active layer insulated from the collector. Contact resistance is then measured from the potential difference (collector to lead) as a function of current density.
[3]E(measured) minus (contact resistance × 0.316).
*Errors for linear regression are given in parenthesis.

EXAMPLE 2

The test configuration and solution conditions described in Example 1 were repeated with the following exceptions and specifics. One electrode was fabricated with a nickel screen collector embedded between the hydrophilic and hydrophobic layers. This electrode was operated with current contact made directly to the embedded collector. A second electrode was fabricated without incorporation of a collector and thus was operated with contact mode by pressure differential. Both electrodes were operated at 0.5 amp/in$^2$ and 5 psi O$_2$ pressure for up to 400 days.

Cathode potential results show that improved stability of operation is observed in the pressure contact mode. The collector contact was regenerated by reduction of the metal surface with a nitrogen gas feed. Hydrogen was evolved. Near 250 days of operation regeneration of the electrode in pressure contact mode results in complete recovery, while at 325 days of operation regeneration of the electrode with the embedded nickel collector did not improve operation.

EXAMPLE 3

The tests described in Example 2 were repeated with silver screen collectors. Greatly improved operational stability is shown by the pressure contact mode of operation. Attempts to regenerate the electrode with the embedded collector failed to improve electrode performance.

This example demonstrates that the embedded collector configuration is inferior to pressure contact probably because of the dimensional incompatibility of the metal collector with the hydrophilic layer. In this configuration pressure acts to minimize an already tenuous electrical contact. In the pressure contact configuration, pressure differential acts to improve the collector-material contact.

EXAMPLE 4

This example demonstrates the importance of pressure contact and the quality of metal to metal contacts in larger scale operation. Here 5"×6" (30 in$^2$) electrodes are operated with different collector configurations. In pressure contact mode electrical contact to the collector screen is made by pressing the screen via the applied oxygen pressure against support rods. The current path now includes the contact between the support rods, spaced at ¼" intervals, and the collector screen. Each of three electrodes, embedded nickel, nickel screen with nickel rods, and silver screen with silver rods, was operated under the following conditions: 0.5 amps/in$^2$, 130 grams per liter sodium hydroxide, 75° C., 2 psi oxygen pressure.

The results are tabulated in Table II. Pressure contact with either nickel or silver materials is superior to the embedded configuration.

TABLE II

| ELECTRODE | START-UP POTENTIAL[1] | 100 DAY POTENTIAL | 200 DAY POTENTIAL |
|---|---|---|---|
| Embedded Ni Screen | −0.40 | −0.74 | Failed |
| Ni Screen Ni Rod | −0.50 | −0.56 | −0.60 |
| Ag Screen Ag Rod | −0.34 | −0.36 | −0.36 |

[1]Potential is measured versus SCE using Luggin probes positioned near the electrode surface.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departure from the spirit and scope of the invention.

The embodiments of the invention in which an exclusive property or privilege is claimed are defined as follows:

1. An electrochemical cell comprising an electrode assembly consisting of a gas diffusion electrode and an electrically conductive current collector means
   (A) said gas diffusion electrode being laminar and having an electrically conductive, porous hydrophilic layer comprising a conductive carbon and a polymeric binder thereof and a porous, hydrophobic layer comprising a hydrophobic polymer and
   (B) said electrically conductive current collector means being in contact with said hydropholic layer and wherein said cell includes means for maintaining solely by gas pressure said hydrophilic layer of said electrode in contact with said current collector means.

2. The electrode assembly of claim 1 wherein said polymeric binder and said hydrophobic polymer comprise a thermoplastic halocarbon polymer.

3. The electrode of claim 2 wherein said thermoplastic halocarbon polymer is selected from the group consisting of at least one of polymers of tetrafluoroethylene, fluorinated ethylene propylene, copolymers thereof having the moieties $$(-CX_1X_2-CX_3CX_4-),$$

and $$(-CY_1Y_2-CY_3Y_4-),$$

and homopolymers having the moieties $$(-CY_1Y_2-CY_3F-)$$

wherein $X_1$, $X_2$, $X_3$, $X_4$, $Y_1$, $Y_2$, $Y_3$, and $Y_4$ are selected from the group consisting of fluorine, chlorine, and hydrogen, at least of said X and Y being fluorine.

4. The electrode of claim 3 wherein said thermoplastic halocarbon polymer is a fluorocarbon polymer selected from the group consisting of at least one of copolymers having an ethylene moiety and a fluorocarbon moiety chosen from the group consisting of $$(-CFH-CH_2-),$$

$$(-CF_2CH_2-),$$

$$(-CF_2-CFH-),$$

$$(-CF_2-CF_2-),$$

and $$(-CF_2-CClF-).$$

5. The electrode of claim 4 wherein said current collector means comprises a metal mesh and a support structure wherein said metal mesh is prepared from a metal selected from the group consisting of stainless steel, nickel, platinum group metals, valve metals, and mixtures thereof.

6. The electrode of claim 5 wherein said metal mesh is prepared from a material selected from the group consisting of silver, silver-coated nickel, silver-coated steel, and silver-coated valve metals.

7. The electrode of claim 6 wherein said conductive carbon is carbon black having a particle size of about 0.01 to about 0.05 microns.

8. The electrode of claim 6 wherein said carbon black is admixed with at least one electrochemically active catalyst.

9. The electrode of claim 8 wherein said catalyst is a precious metal catalyst selected from at least one of the group consisting of platinum, silver, palladium, and rhodium.

10. In an electrochemical reaction process conducted in an electrochemical cell comprising a gas compartment, a semi-permeable membrane disposed between a cathode and an anode so as to form a catholyte compartment and an anolyte compartment, said catholyte compartment containing said cathode and a volume of catholyte, said anolyte compartment containing said anode and a volume of anolyte, the adjacent surfaces of said anode and said cathode being spaced apart sufficiently for said membrane to fit freely therebetween, the process improvement comprising:

utilizing a gas diffusion electrode assembly consisting of
(1) a gas diffusion laminar electrode having an electrically conductive, porous hydrophilic layer comprising conductive carbon and a polymeric binder therefor, and a porous, hydrophobic layer comprising a hydrophobic polymer and
(2) an electrically conductive current collector means in contact with said hydrophilic layer
whereby the electrical potential required to operate said electrochemical cell is reduced by establishing and maintaining sales by gas pressure said hydrophilic layer of said electrode in contact with said current collector means.

11. The process of claim 10 wherein said cell is an electrolytic cell, said electrode is a cathode, and said anolyte compartment contains an aqueous solution of an alkali metal halide and said catholyte compartment contains an aqueous solution of an alkali metal hydroxide and said semi-permeable membrane is an asbestos diaphragm or an ion-exchange permselective membrane.

12. The process of claim 11 wherein said polymeric binder and said hydrophobic polymer each comprises at least one thermoplastic halocarbon polymer.

13. The process of claim 12 wherein said thermoplastic halocarbon polymer is selected from the group consisting of at least one of polymers of tetrafluoroethylene, fluorinated ethylene propylene, copolymers thereof having the moieties $$(-CX_1X_2-CX_3CX_4-)$$

and $$(-CY_1Y_2-CY_3Y_4-),$$

and homopolymers having the moieties $$(-CY_1Y_2-CY_3F-)$$

wherein $X_1$, $X_2$, $X_3$, $X_4$, $Y_1$, $Y_2$, $Y_3$, and $Y_4$ are selected from the group consisting of fluorine, chlorine, and hydrogen, at least one of said X and Y being fluorine.

14. The process of claim 13 wherein said thermoplastic halocarbon polymer is a fluorocarbon polymer selected from the group consisting of at least one of copolymers having an ethylene moiety and a fluorocarbon moiety chosen from the group consisting of (—CFH—CH$_2$—), (—CF$_2$—CH$_2$—), (—CF$_2$—CFH—), (—CF$_2$—CF$_2$—), and (—CF$_2$—CClF—).

15. The process of claim 14 wherein said current collector means comprises a metal mesh and a support structure wherein said metal mesh is prepared from a metal selected from the group consisting of stainless steel, nickel, platinum group metals, valve metals, and mixtures thereof.

16. The process of claim 14 wherein said metal mesh is prepared from a material selected from the group consisting of silver, silver-coated nickel, silver-coated steel, and silver-coated valve metals.

17. The process of claim 16 wherein said carbon black has a particle size of about 0.01 to about 0.05 microns.

18. The process of claim 16 wherein said carbon black is admixed with at least one electrochemically active catalyst.

19. The process of claim 18 wherein said electrochemically active catalyst is a precious metal catalyst selected from at least one of the group consisting of platinum, silver, palladium, and rhodium.

20. In a process for the electrolysis of an alkali metal halide brine wherein an aqueous brine is introduced into an anode compartment of an electrolytic cell containing a gas compartment; water or aqueous alkali metal hydroxide is introduced into a cathode compartment of the cell; said cathode and anode compartments are separated by a semi-permeable membrane; halogen and depleted brine are withdrawn through a common first conduit from the anode compartment to a brine collection point; and alkali metal hydroxide solution is withdrawn through a second conduit from the cathode compartment to an alkali metal hydroxide solution collection point;

the improvement comprising providing as the cathode of said electrolytic cell, a laminar, gas diffusion cathode comprising an electrically conductive, porous hydrophilic layer and a porous hydrophobic layer adjacent to said gas compartment wherein gas pressure applied to said hydrophilic layer at a pressure is solely sufficient to force said cathode against a current collector means so as to make and maintain electrical contact in order to minimize the electrical potential required for electrolysis.

21. The process of claim 20 wherein said hydrophilic layer comprises a conductive carbon and a polymeric binder therefor, and said hydrophobic layer comprises a hydrophobic polymer.

22. The process of claim 21 wherein said polymeric binder and said hydrophobic polymer comprise a thermoplastic halocarbon polymer selected from the group consisting of at least one of polymers of tetrafluoroethylene, fluorinated ethylene propylene, copolymers thereof having the moieties (—CX$_1$X$_2$—CX$_3$CX$_4$—)

and (—CY$_1$Y$_2$—CY$_3$Y$_4$—), and homopolymers having the moieties (—CY$_1$Y$_2$—CY$_3$F—)

wherein $X_1$, $X_2$, $X_3$, $X_4$, $Y_1$, $Y_2$, $Y_3$, and $Y_4$ are selected from the group consisting of fluorine, chlorine, and hydrogen, at least one of said X and Y being fluorine.

23. The process of claim 22 wherein said halocarbon polymer is a fluorocarbon polymer selected from the group consisting of at least one of copolymers having an ethylene moiety and a fluorocarbon moiety chosen from the group consisting of (—CFH—CH$_2$—), (—CF$_2$—CH$_2$—), (—CF$_2$—CFH—), (—CF$_2$—CF$_2$—), and (—CF$_2$—CClF—).

24. The process of claim 23 wherein said conductive carbon is carbon black and said gas is air or oxygen.

25. The process of claim 24 wherein said conductive carbon is admixed with an electrochemically active precious metal catalyst selected from at least one of the group consisting of platinum, silver, palladium, and rhodium and wherein said alkali metal halide is sodium chloride and said alkali metal hydroxide is sodium hydroxide.

* * * * *

UNITED STATES PATENT AND TRADEMARK OFFICE
CERTIFICATE OF CORRECTION

PATENT NO. : 4,722,773

DATED : February 2, 1988

INVENTOR(S) : Keith R. Plowman and Richard E. Zachary

It is certified that error appears in the above-identified patent and that said Letters Patent is hereby corrected as shown below:

Col. 1, line 48; change "curret" to --current--.

Col. 7, line 61; insert --of said electrolyte cell a laminar, gas diffusion cathode-- between "cathode" and "comprising".

Col. 9, line 31; change "improvemnt" to --improvement--.

Col. 11, line 13; change "hydropholic" to --hydrophilic--.

Col. 11, line 28; insert a closing parenthesis --)-- after the formula, which it should read as --$(-CX_1X_2-CX_3CX_4-)$,--.

Col. 11, line 40; insert --one-- between "least" and "of".

Col. 12, line 33; change "sales" to --solely--.

Col. 14, line 24; insert a space between "$X_4$" and "are".

Signed and Sealed this

Twenty-fifth Day of October, 1988

*Attest:*

DONALD J. QUIGG

*Attesting Officer*          *Commissioner of Patents and Trademarks*